(12) United States Patent
Salis et al.

(10) Patent No.: US 9,137,362 B2
(45) Date of Patent: Sep. 15, 2015

(54) METHOD AND SYSTEM FOR MANAGING COMMUNICATION SESSIONS SET-UP BETWEEN USERS

(75) Inventors: Nicoletta Salis, Turin (IT); Danilo Dolfini, Turin (IT)

(73) Assignee: Telecom Italia S.p.A., Milan (IT)

( * ) Notice: Subject to any disclaimer, the term of this patent is extended or adjusted under 35 U.S.C. 154(b) by 887 days.

(21) Appl. No.: 12/809,263

(22) PCT Filed: Dec. 21, 2007

(86) PCT No.: PCT/EP2007/011326
§ 371 (c)(1),
(2), (4) Date: Oct. 29, 2010

(87) PCT Pub. No.: WO2009/080078
PCT Pub. Date: Jul. 2, 2009

(65) Prior Publication Data
US 2011/0058666 A1 Mar. 10, 2011

(51) Int. Cl.
*H04M 1/00* (2006.01)
*H04M 3/42* (2006.01)
*H04L 12/58* (2006.01)

(52) U.S. Cl.
CPC ....... *H04M 3/42374* (2013.01); *H04L 12/5835* (2013.01); *H04L 51/066* (2013.01); *H04L 12/5855* (2013.01)

(58) Field of Classification Search
USPC ............................................ 379/399.01–417
See application file for complete search history.

(56) References Cited

U.S. PATENT DOCUMENTS 6,853,634 B1 2/2005 Davies et al.
7,620,408 B2 * 11/2009 Ye et al. ................ 455/466

(Continued)

OTHER PUBLICATIONS

"Learning and Managing User Context in Personalized Communications Services" by Robert Dinoff; Lucent Technologies May 2006.*

(Continued)

*Primary Examiner* — Yosef K Laekemariam
(74) *Attorney, Agent, or Firm* — Finnegan, Henderson, Farabow, Garrett & Dunner, L.L.P.

(57) ABSTRACT

A method for enabling a calling user to establish a communication session with a called user, the calling user being associated with at least one calling user device and the called user being associated with at least one called user device, wherein the communication session can be established through a plurality of possible communication services and provisioning of said plurality of possible communication services is enabled through a corresponding plurality of communication service actuators, includes: a) receiving from the at least one calling user device, a request to establish a communication session with the called user, b) determining if, among said plurality of possible communication services, there is at least one communication service currently available to establish a communication session with the called user at the at least one called user device, based on current context information on the called user, c) in the affirmative case of b), selecting one of the at least one currently available communication service based on predetermined policies, and d) sending to the communication service actuator that enables the provision of the communication service selected in c) suitable information for starting establishment of the communication session between the calling user and the called user through the selected communication service.

18 Claims, 5 Drawing Sheets

(56) References Cited

U.S. PATENT DOCUMENTS

2004/0203664 A1   10/2004  Lei et al.
2006/0053379 A1*   3/2006  Henderson et al. ........... 715/751
2006/0205400 A1    9/2006  Kiyomoto
2007/0130271 A1*   6/2007  Ye et al. ........................ 709/206

OTHER PUBLICATIONS

International Search Report from the European Patent Office for International Application No. PCT/EP2007/011326 (Mail date Apr. 11, 2008).

Plesa et al., "Enhanced Communication Service Through Context Integration," Mata 2005, pp. 1-5, (Oct. 2005).

Salis et al., "Context Awareness: Telco Perspectives," Second Workshop on Context Awareness for Proactive Systems, CAPS 2006, Kassel, Germany, pp. 1-10, (Jun. 12-13, 2003).

Dinoff et al., "Learning and Managing User Context in Personalized Communications Services," Bell Laboratories, Lucent Technologies, International Workshop on Context in Advance Interfaces, pp. 33-36, (May 23, 2006).

* cited by examiner

METHOD AND SYSTEM FOR MANAGING COMMUNICATION SESSIONS SET-UP BETWEEN USERS

CROSS REFERENCE TO RELATED APPLICATION

This application is a national phase application based on PCT/EP2007/011326, filed Dec. 21, 2007.

BACKGROUND OF THE INVENTION

1. Field of the Invention

The present invention relates to a method and system for managing communication sessions set-up between users.

2. Description of the Related Art

As devices that enable mobile communication are becoming more and more popular, there is an increasing need for users to control and customize their communication, based on the context in which this takes place.

As stated by R. Dinoff et al., ("Learning and Managing User Context in Personalized Communications Services", Bell Laboratories, Lucent Technologies—Int'l Workshop on Context in Advanced Interfaces, 23 May 2006) there is an increasing need for users to have the possibility to get called by the right people in the right way, and to be not bothered by the ones users don't want to deal with for the moment. To this purpose, R. Dinoff et al. propose an availability service which is (i) context-aware, (ii) requester-targeted, and (iii) preferences driven. By context-aware, the Authors mean that the service can take into account the end-user's current context, including dynamic information (e.g., presence on various devices, location, and current usage of devices, and more static information, such as buddy lists and relationships, calendar entries, corporate directory). By requester-targeted, the Authors mean that the answer provided may depend on the person or service that is making the availability request. By preferences driven the Authors mean that the answer provided should reflect the preferences of the end-user in connection with his current context, the request, and the requester.

For setting the user's context, the Authors propose having the system observe the user's behaviour and learn about the user's preferences by detecting usage patterns.

R. Plesa and L. Logrippo ("Enhanced communication service through context integration", publication in MATA 2005, 2005-10) propose a combination of presence information and context information (called "consolidated presence information) to build an intelligent picture of a user's current situation, status and accessibility. For the Authors presence information include the physical location of the user (e.g., at home), call state (e.g., ready, currently on a call), the role of the user or his willingness to communicate (e.g., available, in a meeting), indicators that show if a user is logged into a network and whether he is active and the preferred medium of communication (e.g., voice, IM, e-mail). Moreover, for the Authors human related context includes information about users (e.g., their habits) or the user's social environment (e.g. co-location with others). Context related to physical environment includes location, but also infrastructure and information about surrounding resources for computation and communication.

The Authors state that said consolidated presence information allows users to dynamically set policies that govern the particulars of how they interact with each other. Introducing presence and context information provides ground for new services: context-based services (e.g., "all calls from my students will have announcement X played out"), availability (e.g., "secretaries are not available to answer enquires during lunch time"), notification (e.g., "remind me of the 3 μm group meeting if I am not already in the meeting room") or personal addressing services (e.g., "if the call is from a person involved in project X, redirect it to the team leader").

The Applicant notes that the above two mentioned documents focuses their attention on the called party needs.

US 2006/0205400 discloses a communication system in which a calling party mobile station is capable of automatically obtaining information on a plurality of currently available communication modes of a called party mobile station and charge rate information to enable a user of the calling party mobile station to determine which mode is to be used for communication with the called party mobile station based on the information thus obtained. As stated by US 2006/0205400, with this system the user of the calling party mobile station is given the possibility to select a communication mode by referring to information on both the communication modes supported by the called party mobile station and the unit prices, and is allowed, for example, to select a less expensive communication mode, or to select the TV telephone call mode if he/she wants to see the face of the called party.

SUMMARY OF THE INVENTION

As more and more different devices (PCs, PDAs, mobile phones, . . . ), services (voice call, video call, Instant Messaging, email, SMS/MMS, Push-to-Talk, . . . ) and network interfaces (Bluetooth, Wi-Fi, . . . ) that enable user communications are becoming available, the Applicant perceived the need of making user communications simpler and more effective.

In particular, the Applicant perceived the need for a calling user, desiring to contact a called user at a given time, to reach the desired called user in the best available way at that given time, without worrying about the means (e.g., the device and/or the service and/or the network interface) the calling user has to use and, in particular, without wasting time to try to reach the desired called user through different communication services and/or devices and/or network interfaces till the called user is reached.

The Applicant found that this problem can be solved through a method for enabling a calling user to establish a communication session with a called user, the calling user being associated with at least one calling user device and the called user being associated with at least one called user device, wherein the communication session can be established through a plurality of possible communication services and provisioning of said plurality of possible communication services is enabled through a corresponding plurality of communication service actuators, the method comprising a) receiving from the at least one calling user device a request to establish a communication session with the called user, b) determining if, among said plurality of possible communication services, there is at least one communication service currently available to establish a communication session with the called user at said at least one called user device, based on current context information on the called user, c) in the affirmative case of b), selecting one of the at least one currently available communication service based on predetermined policies, d) sending to the communication service actuator that enables the provision of the communication service selected in c) suitable information for starting establishment of the communication session between the calling user and the called user through the selected communication service.

In the present description and claims, the expressions:

"user" is used to indicate any physical (such as a human) or virtual (such as a software) entity adapted to use a device;

"context information" indicates any information that can be used to characterize the situation of an entity. For example, context information can include information on user's habits, on business commitments, on working hours, on buddy lists and relationships, on calendar entries, on user location (absolute position, relative position, co-location, . . . ), on user's devices (device resources, presence on various devices, current usage of devices, applications/services installed on the user device, . . . ), on network resources, on network connection quality, indication showing if a user is logged into a network, and similar;

"session" with reference to two entities is used to indicate a data transmission from one of the two entities to the other one and/or vice versa, wherein the two entities can communicate with each other directly or through other entities;

"communication session" is used to indicate any voice, video, text session and similar based conversation or conference between two or more entities. Examples of communication sessions include telephone calls, telephone conferences, video conferences, chat sessions, virtual meetings, SMS/MMS and similar;

"network equipment" indicates at least one network apparatus;

"voice call" indicates a voice call that can be established through a circuit-switched telephone network or a packet-switched network;

"multimedia call" indicates a multimedia call that can be established through a circuit-switched telephone network or a packet-switched network.

Preferably, in b), current context information on the called user comprises current context information on network resources and/or capabilities at the called user side.

Preferably, the determination in b) is performed also based on current context information on the calling user.

Preferably, current context information on the calling user also comprises current context information on network resources and/or capabilities at the calling user side.

Preferably, the determination in b) is performed also based on predefined called user preferences.

Preferably, the determination in b) is performed also based on predefined calling user preferences.

For example, the communication services can be selected from the group comprising: voice call, multimedia call, Push to talk, instant messaging, SMS (short message service), MMS (multimedia messaging service), virtual communications, e-mail and fax messaging.

The suitable information sent in d) advantageously comprises called user identifying data that enable establishment of a communication session with the called user through the communication service selected in c).

Advantageously, the method further comprises accessing a storage area to retrieve said called user identifying data, said storage area comprising a list of communication services associated with the called user and, for each associated communication service, a list of identifying data that allow establishment of a communication session with the called user through such associated communication service.

The suitable information sent in d) advantageously also comprises data identifying the calling user.

The suitable information sent in d) advantageously also comprises data identifying the calling user device.

According to an embodiment, the request received in a) specifies a preselected communication service, among said plurality of possible communication services, to contact the called user.

In this embodiment, the method advantageously comprises b') determining if said preselected communication service is currently available to establish a communication session with the called user at said at least one called user device, based on current context information on the called user.

Preferably, the determination in b') is performed also based on current context information on the calling user.

Preferably, the determination in b') is performed also based on predefined called user preferences.

Preferably, the determination in b') is performed also based on predefined calling user preferences.

In the affirmative case of b'), the method comprises d') sending to the communication service actuator, that enables the provision of the preselected communication service specified in the request received in a), suitable information for starting establishment of the communication session between the calling user and the called user through said preselected communication service.

In this embodiment, step b) is advantageously executed in the negative case of b').

Said plurality of possible communication services can comprise communication services of at least two communication service typologies.

Said at least two communication service typologies can comprise, for example, a direct communication service typology and a messaging communication service typology.

The services of the direct communication service typology can be selected from the group comprising: voice call, multimedia call, Push to talk and communications established in a virtual reality. The services of the messaging communication service typology can be selected from the group comprising: instant messaging, SMS (short message service), MMS (multimedia messaging service), e-mail, virtual messaging (e.g., through AVATARs in a virtual reality) and fax messaging.

When the communication service selected in c) (or the preselected communication service specified in the request received in a)) is of the messaging communication service typology, the method advantageously further comprises receiving from the calling user device a message for the called user, said message complying with a predetermined user device communication protocol. The method advantageously further comprises converting said message into a corresponding message complying with a communication protocol supported by the communication service actuator that enables the provision of the communication service selected in c) (or that enables the provision of the preselected communication service specified in the request received in a)). In this case, the information sent in d) (or d')) advantageously comprises said converted message.

This is a particularly advantageous aspect of the invention in that it allows the calling user device to send the message for the called user according to a same predetermined user device communication protocol, independently on the specific messaging communication service actually used to establish the communication session with the called user. Therefore, the calling user is, for example, enabled to send a SMS, a MMS and/or an e-mail message to the called user, without having the calling user device suitably configured to send SMS, MMS and/or e-mail messages.

This make the user device more user friendly in that it gives the user the possibility to exploit the large variety of communication services nowadays at his/her disposal without being required to carry out a plurality of annoying, time consuming and quite complicated configuration operations to enable his/her user device to access SMS, MMS and/or e-mail services.

Moreover, the calling user can be enabled to reach the called user through a specific messaging communication service, even if the calling user or the calling user device does not support it. For example, the calling user can be enabled to reach the called user through an e-mail message even if the calling user has not an associated e-mail address or even if the calling user device does not support e-mail services.

Furthermore, the calling user is enabled to reach the called user without worrying about the called user device configuration and about the services supported by the called user devices.

The above is advantageous also for the network operator because a reduction of the difficulties met by the users in exploiting the large variety of offered communication services can contribute to spread the use of such services among the subscribers.

According to an embodiment, the request received in a) specifies a preselected communication service typology, among said at least two communication service typologies, to establish a communication session with the called user.

In this embodiment, the determination in b) is advantageously carried out within said preselected communication service typology.

In the negative case of b), the determination in b) is advantageously carried out again within the other(s) of the at least two communication service typologies.

If there is at least one communication service currently available within the other(s) of the at least two communication service typologies, c) and d) are executed.

When there is no service currently available to establish a communication session with the called user within any of the at least two communication service typologies, the calling user device is notified accordingly.

Preferably, the method further comprises notifying the communication service selected in c) to the calling user device.

According to an embodiment, step d) can be advantageously executed if an approval to establish a communication session with the called user through the communication service selected in c) is received from the calling user device.

When an approval to establish a communication session with the called user through the communication service selected in c) is not received from the calling user device, the method advantageously comprises e) offering to the calling user device the possibility to book a communication session with the called user through a service within the preselected communication service typology specified in the request received in a) (or through the preselected communication service specified in the request received in a)). If acceptance of said offer is received from the calling user device, the method advantageously comprises f) checking for a predetermined period of time if at least one communication service, within the preselected communication service typology specified in the request received in a) (or the preselected communication service), becomes available to establish a communication session with the called user at said at least one called user device, based on current context information on the called user and on the calling user. In the positive case of f), the method advantageously comprises g) sending to the communication service actuator, that enables the provision of the communication service that has become available, suitable information for starting establishment of the communication session between the calling user and the called user through such communication service. Preferably, in the positive case of f), the method advantageously comprises notifying the calling user device about the communication service that has become available. Moreover, g) is advantageously performed under receipt of an approval by the calling user device.

Steps e), f) and g) can be performed also when there is no service currently available to establish a communication session with the called user.

Advantageously, according to said policies, the communication service providing the highest level of interactivity is selected in c).

Advantageously, according to said policies, the communication service providing the shortest expected response time is selected in c).

Advantageously, according to said policies, the communication service meeting predetermined (calling and/or called) user preferences is selected in c).

In an embodiment, according to said policies the cheapest communication service can be selected in c).

In an embodiment, according to said policies the communication service guaranteeing the simplest and/or preferred human-machine-interface can be selected in c).

In an embodiment, according to said policies the communication service that allows reaching the called user in the most rapid way can be selected in c).

Typical examples of user devices are telephone sets, IP (Internet Protocol) phones, cellular or mobile phones, TV sets, set-top boxes, Hi-Fi systems, fax machines, IP-TV gateways, personal computers, personal digital assistant (PDA) and similar.

In another aspect, the invention relates to a network equipment for enabling a calling user, associated with at least one calling user device, to establish a communication session with a called user, associated with at least one called user device, the network equipment comprising modules adapted a) to receive from the at least one calling user device a request to establish a communication session with a called user, b) to determine if, among a plurality of possible communication services, there is at least one communication service currently available to establish a communication session with the called user at the at least one called user device, based on current context information on the called user, c) in the affirmative case of b), to select one of the at least one currently available communication service based on predetermined policies, and d) to send to a communication service actuator that enables the provision of the communication service selected in c) suitable information for starting establishment of the communication session between the calling user and the called user through the selected communication service.

As far as further features of this aspect of the invention are concerned, reference is made to what disclosed above with reference to the first aspect of the invention.

In another aspect, the invention relates to a communication system comprising a plurality of user devices, a network equipment and a plurality of communication service actuators enabling provision of a corresponding plurality of communication services, wherein each of the plurality of user devices comprises modules adapted to send to the network equipment a request to establish a communication session between a calling user and a called user, the called user being associated with at least one called user device;

the network equipment comprises modules that, for each request sent from one of the plurality of user devices, are adapted:

a) to receive said request;
b) to determine if, among said plurality of communication services, there is at least one communication service currently available to establish a communication session with the called user at the at least one called user device, based on current context information on the called user,
c) in the affirmative case of b), to select one of the at least one currently available communication service based on predetermined policies, and
d) to send to the communication service actuator that, among said plurality of communication service actuators enables the provision of the communication service selected in c), suitable information for starting establishment of the communication session between the calling user and the called user through the corresponding communication service; and wherein each communication service actuator comprises modules adapted to receive said suitable information from the network equipment and to use said suitable information to start establishment of the communication session between the calling user and the called user through the corresponding communication service.

As far as further features of this aspect of the invention are concerned, reference is made to what disclosed above with reference to the first aspect of the invention.

The invention in the various aspects thereof allows achieving the following advantages.

From the point of view of the calling user, it enables the calling user to communicate with the desired called user, without facing common difficulties in the use of different devices, services and/or network interfaces. Moreover, it spares the calling user the waste of time for trying to reach the desired called user through different communication services and/or devices and/or network interfaces till the called user is reached (e.g., by first trying with a telephone call from the calling user phone; if there is no answer, trying to check, at the calling user's PC, if the called user is available through Instant messaging communication; if he/she is not available, trying to send an e-mail by the calling user's PC; then, if an out-of-office reply message is received, trying to send a SMS from the calling user phone).

From the point of view of the network operator, the invention spares the network operator useless cost and waste of network resources for trying to satisfy different attempts by a same calling user to contact a same called user. Moreover, for the network operator it improves the capability to meet the need of a calling user and reduces the possibility of missing opportunities to establish communication sessions among users.

Considering that even null communication session requests are a cost for the device Hardware/Software elements (battery, CPU, RAM, . . . ) and that this could impact on the general lifetime and performances of a device and on the usage possibility thereof, the invention—by reducing the possibility of performing null communication session requests—is advantageous also from the point of view of the calling user device.

Moreover, the invention advantageously guarantees the calling user to reach the called user in the best available way at a given time as far as concern the situation of the called user and the network capabilities.

Additionally, the invention enables to better exploit all the electronic devices nowadays at users' disposal.

The invention is also particularly advantageous when the called user is associated with a plurality of called user devices and communication services in that it allows managing at best the plethora of services and devices that can be used to reach the called user.

BRIEF DESCRIPTION OF THE DRAWINGS

The features and advantages of the present invention will be made apparent by the following detailed description of some exemplary embodiments thereof, provided merely by way of non-limiting examples, description that will be conducted by making reference to the attached drawings, wherein.

DETAILED DESCRIPTION OF THE INVENTION

Figure 1:
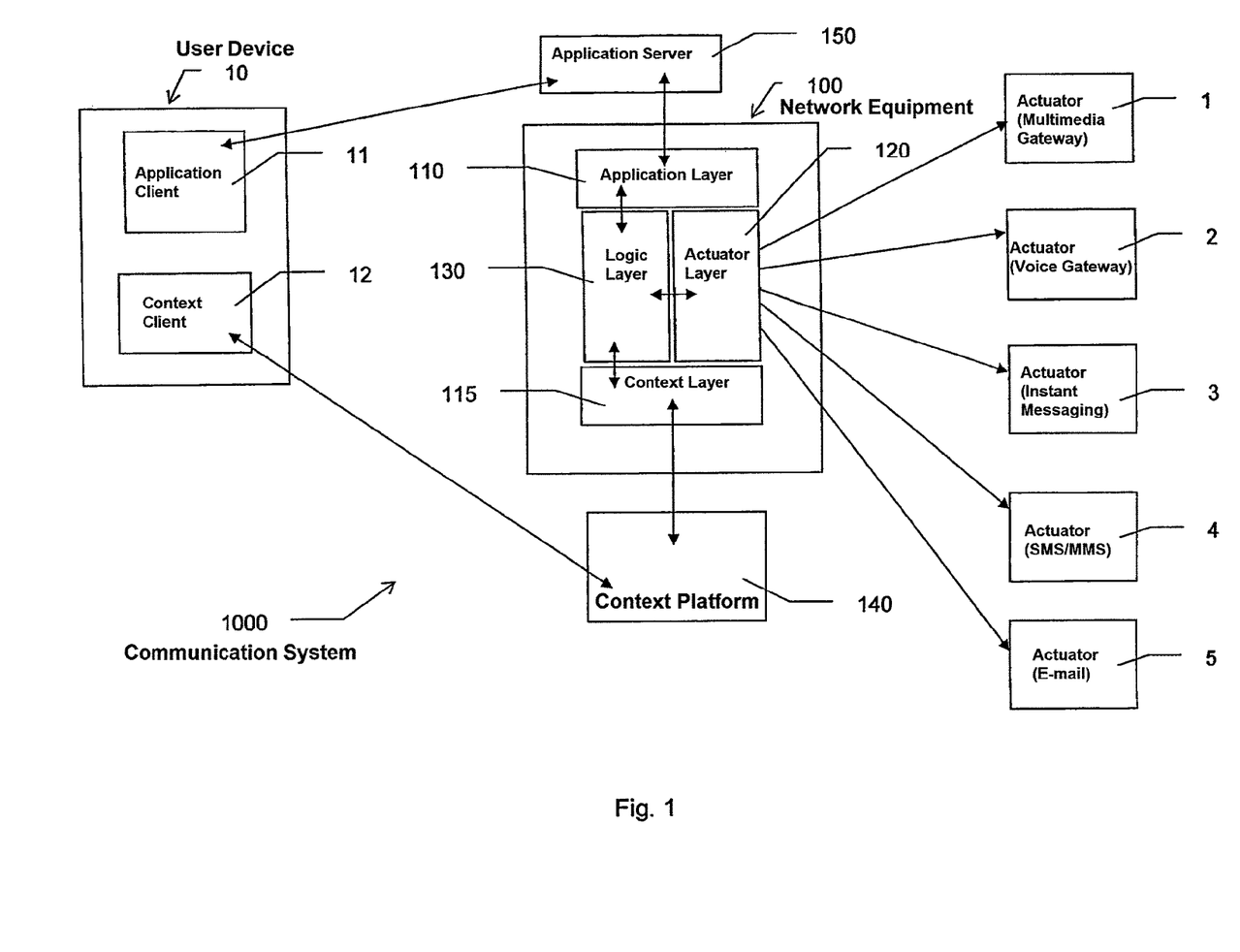
FIG. 1 schematically shows an embodiment of a communication system according to the invention.

FIG. 1 shows a communication system 1000 according to an embodiment of the invention. According to this embodiment, the communication system 1000 comprises a network equipment 100, a user device 10, an application server 150, a context platform 140, and a plurality of actuators 1, 2, 3, 4, 5 for the provision of a plurality of communication services.

In the embodiment shown, actuator 1 is a multimedia gateway enabling provision of multimedia call services, actuator 2 is a voice gateway enabling provision of voice call services, actuator 3 is a Instant Messaging center enabling provision of Instant messaging services, actuator 4 is a SMS/MMS center enabling provision of SMS/MMS services, and actuator 5 is an e-mail server enabling provision of e-mail services.

It is noted that for the sake of simplicity only five actuators are depicted in FIG. 1. However, the communication system 1000 can comprise more (or less) actuators providing additional (different) communication services as, for example, VoiP, Push to Talk and fax services.

Moreover, it is noted that, even if the communication system 1000 usually comprises a plurality of user devices, for the sake of simplicity only one user device is depicted in FIG. 1.

In the embodiment shown, the network equipment 100 comprises an application layer 110, an actuator layer 120, a logic layer 130 and a context layer 115.

The user device 10 comprises an application client 11 and, in a preferred embodiment, also a context client 12.

The application server 150, the context platform 140, the application layer 110, the actuator layer 120, the logic layer 130, the context layer 115, the application client 11, the context client 12, and the actuators 1, 2, 3, 4, 5 are adapted to implement the invention, in the various aspect thereof, as described in more detail hereinafter, with reference to FIGS. 2 to 6.

According to the invention, a calling user wishing to establish a communication session with a called user sends a corresponding request from the user device 10 towards the application server 150.

Figure 2:
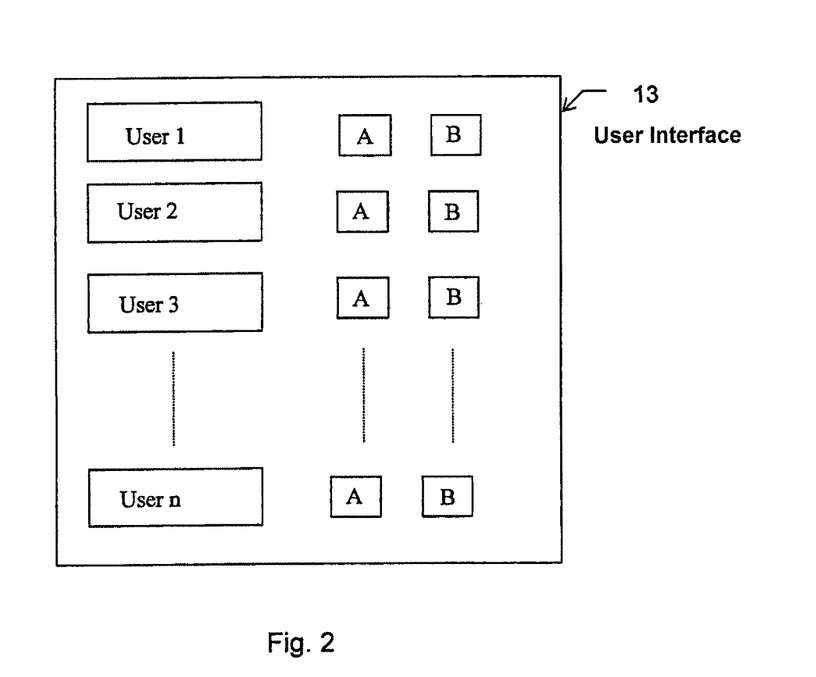
FIG. 2 schematically shows an example of a user device interface allowing a calling user to make a request for establishing a communication session with a called user according to the invention.

To send such request the calling user can use a user interface 13 on user device 10 of the type exemplarily shown in FIG. 2.

According to the example shown in FIG. 2, the calling user can select the desired called user (e.g. user 1) from a suitable list of users (e.g. user 1, user 2, . . . user n) and can select to establish a communication session with such desired called user through one of two typologies of communication services by clicking on one of two icons A and B representing the two typologies. For example, said two typologies of communication services are direct communication services typology and messaging communication services typology.

When said request (for establishing a communication session with a desired called user through one of the two typologies of communication services) is received at the application server 150, the latter sends the request to the application layer 110, which, in its turn, passes the request to the logic layer 130.

Figure 3:
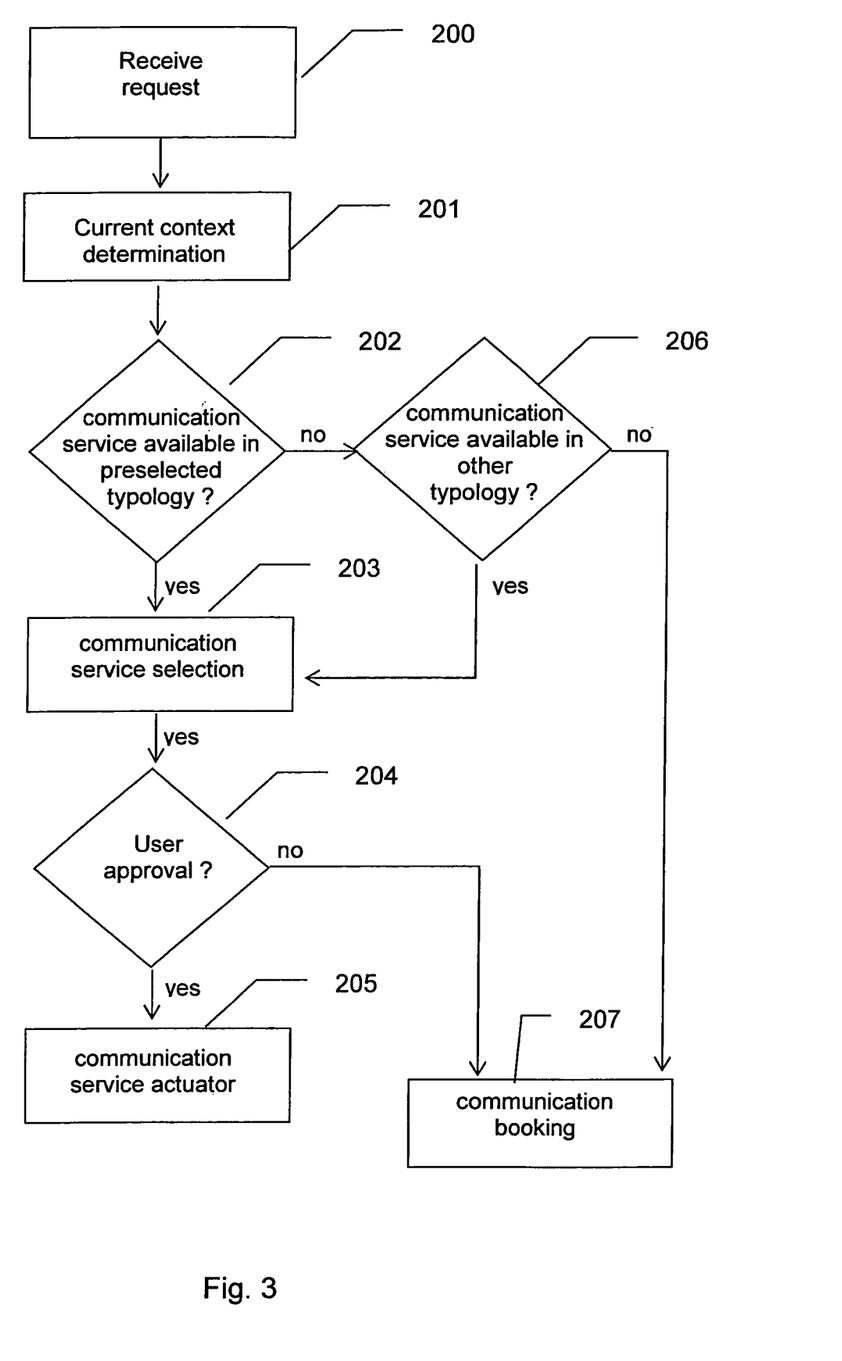
FIG. 3 schematically shows a flowchart outlining the main actions carried out to establish a communication sessions between a calling user and a called user, according to an embodiment of the invention.

As schematically shown in the flowchart of FIG. 3, at block 200 the logic layer 130 receives said request.

When the calling user desires to establish a communication session with the called user through the messaging communication service typology, the network equipment 100 will further receive from the user device 10 a message content, according to a predetermined user device communication protocol, for the called user. Said message content can be received at block 200 together with the request for establishing a communication session with the called user or, after, under explicit request by the network equipment 100.

At the receipt of said request, logic layer 130 interrogates, through intermediation of context layer 115, the context platform 140 about the current context of the called user and, preferably, also of the calling user (block 201). When the context client 12 is present, the context platform 140 will determine the current context also based on information retrieved by the context client 12.

The current context of the called user and calling user is determined by the context platform 140 according to techniques known in the art adapted to determine the real-time situation of an entity as far as concern, for example, user location, presence on various devices, current usage of device, user's habits, business commitments, working hours, calendar entries, network resources, network connection quality and/or similar. This allows, for example, determining if the called user is currently in a business meeting, if he/she is currently engaged in a telephone call at a user device, if he/she is currently using the PC, if he/she is currently available for Instant messaging communication, if/she is currently driving the car, if his/her mobile phone is currently switched off, if his/her mobile phone support multimedia communication session (e.g., a video call), if the network resources and the network connection quality currently support a communication service and so on.

The determination of also the current context of the calling user is preferable in that it can be useful to determine if the current resources of the calling user device and the current network connection quality at the calling user device side are adapted to support a predetermined communication service (e.g., a video call).

The current context of the calling user and of the called user is advantageously determined according to automatic techniques. Moreover, it can also be advantageously determined based on direct suggestions/information from the user.

Techniques to determine the context of an entity are known for example from the above mentioned documents by R. Dinoff et al., ("Learning and Managing User Context in Personalized Communications Services", Bell Laboratories, Lucent Technologies—Int'l Workshop on Context in Advanced Interfaces, 23 May 2006) and by R. Plesa and L. Logrippo ("Enhanced communication service through context integration", publication in MATA 2005, 2005-10), and from N. Salis and C. A. Licciardi ("Context Awareness: Telco Perspectives", publication in the proceedings of the Second Workshop on "Context Awareness for Proactive Systems CAPS 2006", Kassel, Germany, Jun. 12-13, 2006).

Based on current context information on the called user and on the calling user, received from the context platform 140, the logic layer 130 determines if, within the communication service typology preselected by the calling user, there is at least one communication service currently available to establish a communication session with the called user (block 202).

For example, if the communication service typology preselected by the calling user is the messaging communication service typology and the called user (e.g., user 1) is at work, his/her office mobile phone is switched on, his/her private mobile phone is switched off, he/she is working at the office PC, he is available for Instant messaging communication with the calling user, and he is engaged in a telephone call by the office fixed phone, the communication services available to establish a communication session with the called user within the messaging communication service typology can exemplarily be: Instant-messaging communication, SMS or MMS to the office mobile phone and e-mail to the e-mail account registered at the office PC.

Moreover, the determination at block 202 is advantageously determined also based on predetermined user preferences.

To this purpose, the logic layer 130 will access a storage area (not shown) comprising, for each registered user, a list of predetermined user preferences.

According to another embodiment, such storage area will be accessed to from the context platform 140, which will then send said predetermined user preferences to the logic layer 130.

For example, in said user preference list a user can set not to be disturbed at his/her mobile phone(s) during business meetings, not to be disturbed by predetermined people at his/her private mobile phone(s) during working hours, not to be disturbed at his/her mobile phone(s) when already engaged in a telephone conversation by his/her fixed phone, and similar.

If the check at block 202 gives a positive result, the logic layer 130 selects, among the at least one currently available communication service, the best communication service to establish a communication session with the called user, based on predetermined policies (block 203). Of course, if there is only one currently available communication service, logic layer 130 will select such communication service.

Moreover, at block 203 a notification of the best communication service selected by the network equipment 100 is advantageously sent to the user device 10.

Then, the actuator layer 120 sends suitable information/instructions to the communication service actuator enabling the provision of the best communication service thus selected, so as to start establishment of the communication session between the calling user and the called user through the selected best communication service (block 205).

According to the embodiment shown, action at block 205 is executed if an approval to establish a communication session with the called user through the best communication service selected at block 203 is received from the calling user device 10 (check at block 204).

If the check at block 202 gives a negative result (i.e., within the communication service typology preselected by the calling user there is not at least one communication service currently available to establish a communication session with the called user), the logic layer 130 determines if, within the other one of the two communication service typologies, there is at least one communication service currently available to establish a communication session with the called user (block 206).

If the check at block 206 gives a negative result, a notifying message is advantageously sent to the user device 10 (not shown).

If the check at block 206 gives a positive result, the procedure returns to block 203.

Even if not shown, if the best communication service selected at block 203 is within the messaging communication service typology, the network equipment 100 will request the user device 10 to send a message content for the called user, if not already at its disposal.

Moreover, when a communication session is established through a communication service within a typology different from the one preselected by the calling user, the invention can also contemplate an embodiment (not shown) wherein the logic layer 130 is adapted to verify if, during the time the established communication session is on, at least one communication service within the typology originally chosen by the user becomes available and, in the affirmative, to enable the calling user to switch the communication session towards such communication service.

For example, if the calling user originally chooses a direct communication service typology but the communication session is established through instant messaging due to the called user's phone being busy, when the called user's phone gets free the calling user can be enabled to switch to the original choice (e.g., a voice/video call). For example, this may be useful for saving time when the instant messaging communication risks becoming too long.

Moreover, if, for example, the calling user originally chooses a video call but the communication session is established through voice call due to poor network connection quality, when the network connection quality improves the calling user can be enabled to switch to the original choice for a video call.

If the check at block 204 or 206 gives a negative result (that is when an approval to establish a communication session through the best communication service selected at block 203 is not received from the calling user device 10 or when there is no service currently available to establish a communication session with the called user), the calling user is offered the possibility to book a communication session with the called user through the preselected communication service typology originally specified in the request received at block 200 (block 207). Advantageously, the calling user is also given the possibility to set a validity period for the communication session booking.

Figure 4:
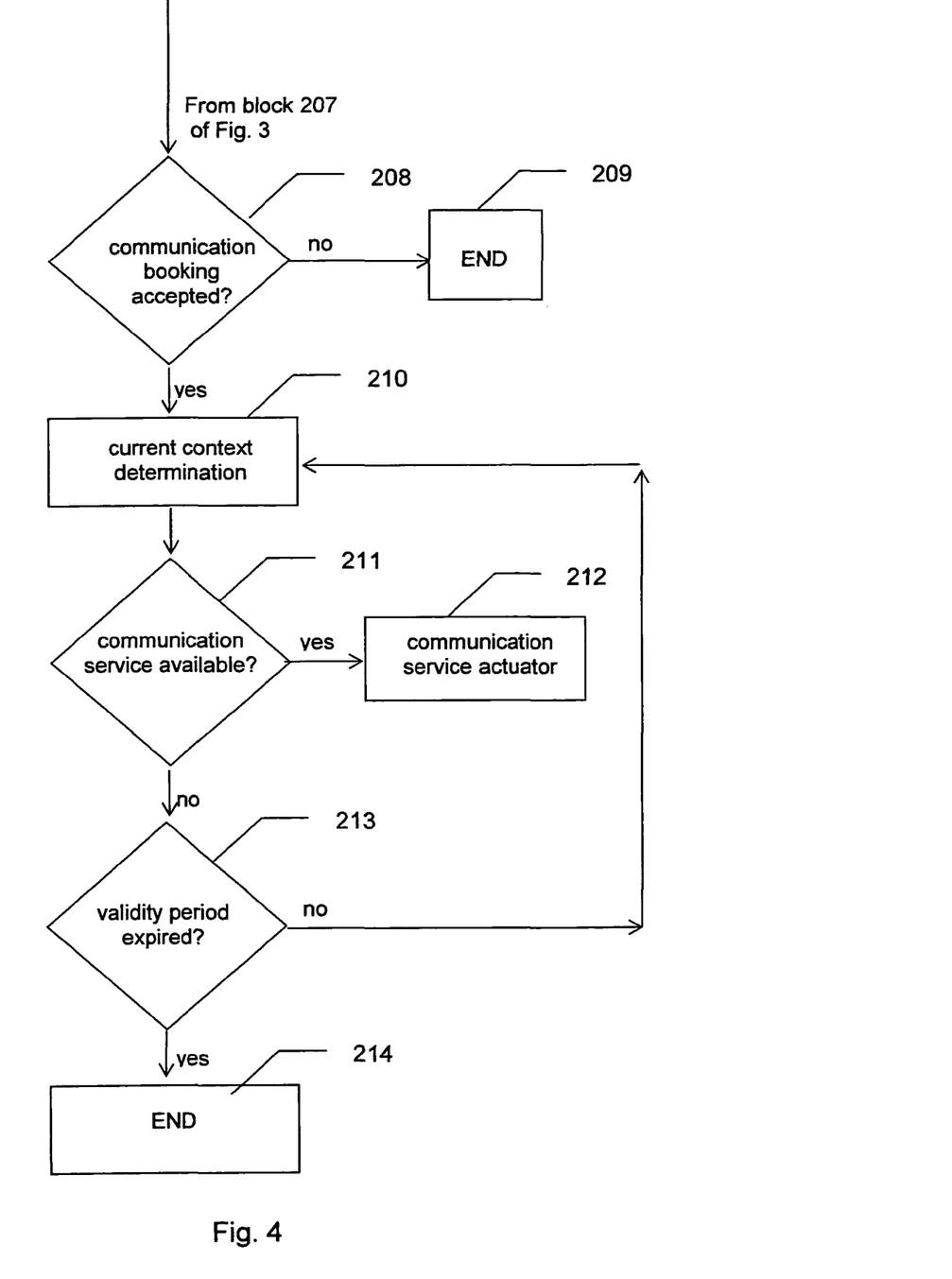
FIG. 4 schematically shows a flowchart outlining the main actions carried out to book a communication session between the calling user and the called user, according to an embodiment of the invention.

As schematically shown in the flowchart of FIG. 4 (which is a continuation of the flowchart of FIG. 3), the logic layer 130 checks if acceptance of said offer is received from the user device 10 (block 208).

If acceptance of said offer is not received from the user device 10, the procedure ends (block 209).

If acceptance of said offer (for example, specifying the validity period) is received from the user device 10, the logic layer 130 cooperates with the network equipment context platform 140 to determine the current context of the called user and, preferably, also of the calling user (block 210).

Based on the determined current context information on the called user and on the calling user and based on user preferences, the logic layer 130 determines if at least one communication service, within the communication service typology originally selected by the calling user, becomes available to establish a communication session with the called user (block 211).

In the positive case, the actuator layer 120 sends suitable information to the communication service actuator enabling the provision of the communication service that has become available so as to start establishment of the communication session between the calling user and the called user through such communication service (block 212). Moreover, at block 212 the user device 10 is notified about the communication session that is going to be established with the called user through the communication service that has become available. According to an embodiment (not shown), the communication session is established under receipt of an approval by the user device 10.

If the check at block 211 gives a negative result, it is checked if the validity period set by the user device 10 expired (block 213).

If the validity period has not expired, the procedure returns at block 210.

If the validity period has expired, the procedure ends (block 214).

When at block 205 or 212 the actuator layer 120 sends said suitable information to the appropriate communication service actuator, the latter will provide for the corresponding communication service to be implemented, through conventional techniques.

For example, in the case of the SMS/MMS actuator 4, it will provide for a SMS/MMS to be sent to the called user according to techniques well known in the art.

To this purpose, the suitable information sent by the actuator layer 120 to the actuators will comprise all the information required, according to techniques known in the art, to establish a communication session through to the specific communication service.

For example, in the case of SMS/MMS actuator 4 and SMS communication service, the suitable information will comprise a text content for the called user, an identifier of the called user (e.g., SIM number) to which the SMS has to be sent, and an identifier of the calling user (e.g., SIM number).

When the communication session with the called user has to be established through a given communication service of the messaging communication service typology, the logic layer 130 is advantageously adapted to convert the message received from the calling user device 10, according to a predetermined user device communication protocol, into a corresponding message for the called user which complies with the communication protocol supported by the communication service actuator enabling the provision of said given communication service.

In this case, the information sent at block 205 or 212 advantageously comprises such converted message.

The message received from the calling user device 10 and the converted message can comprise, in accordance with the respective protocol, a body with the text/multimedia content for the called user and suitable headers (e.g., a TO header and a FROM header).

For example, the predetermined user device communication protocol can be Hypertext Transfer Protocol (or HTTP) or Session Initiation Protocol (SIP).

Examples of communication protocol supported by the actuators 1, 2, 3, 4, 5 are the Mobile Application Part (MAP) protocol for the SMS/MMS actuator, and the Simple Mail Transfer Protocol (SMTP) for the e-mail actuator.

This last aspect of the invention is particularly advantageous in that it allows the user device 10 to send the message for the called user according to a same predetermined user device communication protocol, independently on the specific messaging communication service actually used to establish the communication session with the called user. Therefore, the calling user is, for example, enabled to send a SMS, a MMS and/or an e-mail message to the called user, without having the calling user device 10 suitably configured to send SMS, MMS and/or e-mail messages.

This makes the user device 10 more user friendly in that it gives the user the possibility to exploit the large variety of communication services nowadays at his/her disposal without being required to carry out a plurality of annoying, time consuming and quite difficult configuration operations to enable his/her user device to access SMS, MMS and/or e-mail services.

Moreover, it can enable the calling user to reach the called user through a specific messaging communication service, even if the calling user or the calling user device does not support it. For example, it enables the calling user to reach the called user through an e-mail message even if the calling user has not an associated e-mail address or even if the calling user device does not support the e-mail service.

This is also advantageous for the network operator because a reduction of the difficulties met by the users in exploiting the large variety of communication services offered by it can contribute to the spread of the use of such services among the subscribers.

As mentioned before, at block 203 the best communication service to establish a communication session with the called user is selected based on predetermined policies.

According to a preferred embodiment of the invention, said policies get the communication service providing the highest level of interactivity and the shortest expected response time to be selected. Advantageously, said policies also take into account predefined calling and called user preferences.

Figure 5:
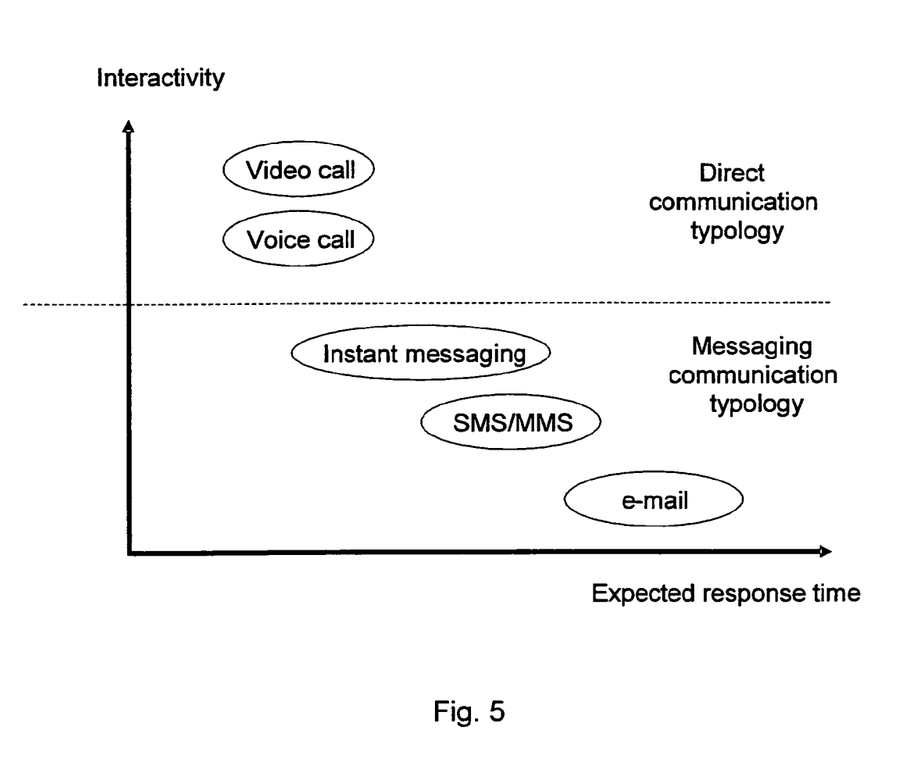
FIG. 5 schematically shows an exemplary mapping of communication services in an interactivity versus expected-response-time domain.

FIG. 5 schematically shows a mapping of multimedia call and voice call services (in the direct communication typology), and Instant Messaging, SMS/MMS and e-mail services (in the messaging communication typology) in interactivity versus expected-response-time domain.

In said domain, the multimedia call is the service providing the highest interactivity, followed by voice call, instant messaging, SMS/MMS and e-mail. Moreover, multimedia call and voice call are the services providing the shortest expected response time, followed by instant messaging, SMS/MMS and e-mail.

If, for example, the communication service typology preselected by the calling user is the direct communication service typology and the called user is at work, his/her office mobile phone is switched off, his/her private mobile phone is switched on and supports both multimedia and voice call, he/she is working at the office PC, he is available for Instant messaging communication with the calling user, and he is engaged in a telephone call at the office fixed phone, the communication services available to establish a communication session with the called user within the direct communication service typology would exemplarily be: multimedia or voice call to his private mobile phone.

According to the map shown in FIG. 5, the best communication service selected at block 203 among the available communication services would be a multimedia call to the called user private mobile phone. However, if the calling user set a default preference for voice call, the best communication service selected at block 203, meeting both the policies represented in FIG. 5 and the calling user preferences would be a voice call to the called user private mobile phone.

Moreover, if, for example, the called user set a preference of not being disturbed by a telephone call on his private mobile phone, when already engaged in another telephone call with his/her office mobile/fixed phone, the communication services available to establish a communication session with the called user within the other (messaging communication service) typology would exemplarily be: Instant-messaging communication, SMS or MMS to his private mobile phone and e-mail to the e-mail account registered at his/her office PC.

In this case, according to the map shown in FIG. 5, the best communication service selected at block 203 would be the Instant messaging.

It is noted that, even if not shown, the invention contemplates also the case wherein the calling user is given the possibility to specify the intention to establish a communication session with the desired called user through a preselected communication service among the plurality of possible communication services (e.g., by clicking on one of a plurality of icons representing the plurality of communication services in a suitable user interface on user device 10) and/or the case wherein the user is simply given the possibility to request to establish a communication session with the desired called user in general, without specifying any communication service.

In the first case, between block 201 and block 202 the logic layer 130 can be adapted to determine if the communication service preselected by the calling user is currently available to establish a communication session with the called user, based on current context information on the called user and, preferably, also on the calling user (as determined at block 201) and, advantageously, also based on the calling user and called user preferences.

In the affirmative case, action at block 205 is carried out by sending suitable information to the communication service actuator enabling the provision of said preselected communication service, so as to start establishment of the communication session between the calling user and the called user through the preselected communication service.

In the negative case, the user device 10 may be notified that the communication service preselected by the calling user is not currently available. Moreover, check at block 202 will be advantageously carried out within the whole plurality of possible communication services and check at block 206 will be omitted.

In the first case, the calling user can also be given the possibility of directly trying to establish a communication session with the desired called user with the preselected communication service, by directly passing from block 200 to block 205.

In the second case, the check at block 202 is advantageously performed within the whole plurality of possible communication services.

In view of the above, it will be clear that the invention, in the various aspects thereof, enables a communication network operator and a user to manage at best the plethora of services, network interfaces and devices nowadays available to communicate;

enables users to avoid wasting time in the use of different devices and/or services and/or network interfaces and to interface just once to the communication network in order to establish a communication session with a desired called user: through a simple gesture (e.g., a "click" on a suitable icon in the user interface on user device 10 or a sentence by a Text-To-Speech client) the users are given the possibility to contact the desired called user in the best available way at that time;

enables the network to avoid wasting resources to satisfy different attempts by a same calling user trying to reach a desired called user;

when a user with more than one device at his/her disposal has to be contacted, it avoids the network making all devices ring, with a consequent network resources waste;

increases the level of politeness (according to the user perception) in user communications (e.g., by reducing the possibility of receiving undesired telephone call at the wrong moment or of hearing a forced busy tone when calling a busy person in the wrong moment);

enables users to exploit at best all the electronic devices at their disposal;

enables users to automatically select the best communication service currently available to reach a desired person;

guarantees the calling user to reach the called user in the best way as far as concern the current user situation and the current network possibilities and capabilities;

enables the network to guarantee a communication link to its users by changing/alternating different communication services (e.g. voice call, video call, e-mail, Instant Messaging, SMS, MMS, etc. . . . ) when the desired one is not available.

As a matter of fact, the invention enables people to communicate, without worrying about "how".

The invention claimed is:

1. A method for enabling a calling user to establish a communication session with a called user, the calling user being associated with at least one calling user device and the called user being associated with at least one called user device, wherein the communication session can be established through a plurality of possible communication services and provisioning of said plurality of possible communication services is enabled through a corresponding plurality of communication service actuators, comprising:
  a) receiving from the at least one calling user device a request to establish a communication session with the called user;
  b) determining if, among said plurality of possible communication services, there is at least one communication service currently available to establish a communication session with the called user at said at least one called user device, based on current context information on the calling user and current context information on the called user;
  c) in the affirmative case of b), selecting one of the at least one currently available communication service based on predetermined policies, wherein said predetermined policies comprise comparing at least the level of interactivity for each respective available communication service and selecting the at least one currently available communication service having the highest level of interactivity, wherein the level of interactivity ranges highest to lowest between services of a direct communication service typology and services of a messaging communication service typology; and
  d) sending to the corresponding communication service actuator suitable information for establishing the communication session between the calling user and the called user through the selected communication service.

2. The method according to claim 1, wherein the current context information on the calling user comprises current context information on network resources and/or capabilities of the calling user.

3. The method according to claim 1, wherein the determination in b) is performed also based on predefined called user preferences.

4. The method according to claim 1, wherein the determination in b) is performed also based on predefined calling user preferences.

5. The method according to claim 1, wherein the request received in a) specifies a preselected communication service, among said plurality of possible communication services, to contact the called user.

6. The method according to claim 5, further comprising: b') determining if said preselected communication service is currently available to establish a communication session with the called user at said at least one called user device, based on current context information on the called user.

7. The method according to claim 6, wherein b) is executed in the negative case of b').

8. The method according to claim 1, wherein said plurality of possible communication services comprises communication services of at least two communication service typologies.

9. The method according to claim 8, wherein said at least two communication service typologies comprise a direct communication service typology and a messaging communication service typology.

10. The method according to claim 9, wherein, when the communication service selected in c) is of the messaging communication service typology, further comprising receiving from the calling user device a message for the called user, said message complying with a predetermined user device communication protocol.

11. The method according to claim 10, further comprising: converting said message into a corresponding converted message complying with a communication protocol supported by the communication service actuator that enables the provision of the communication service selected in c).

12. The method according to claim 11, wherein the suitable information sent in d) comprises a converted message.

13. The method according to claim 8, wherein the request received in a) specifies a preselected communication service typology, among said at least two communication service typologies, to establish a communication session with the called user.

14. The method according to claim 13, wherein the determination in b) is first carried out within said preselected communication service typology.

15. The method according to claim 14, wherein, when there is no communication service currently available within said preselected communication service typology, the determination in b) is carried out again within the other of the at least two communication service typologies.

16. The method according to claim 1, wherein, according to said policies, the communication service is selected in c) according to at least one of the following conditions: the communication service meeting predetermined calling user preferences; the communication service meeting predetermined called user preferences; the cheapest communication service; the communication service guaranteeing a simplest human-machine-interface; the communication service guaranteeing a preferred human-machine-interface; and the communication service that allows reaching the called user in the most rapid way.

17. Network equipment for enabling a calling user associated with at least one calling user device, to establish a communication session with a called user, associated with at least one called user device, comprising modules configured:
   a) to receive from the at least one calling user device a request to establish a communication session with a called user;
   b) to determine if, among a plurality of possible communication services, there is at least one communication service currently available to establish a communication session with the called user at the at least one called user device, based on current context information on the calling user and current context information on the called user;
   c) in the affirmative case of b), to select one of the at least one currently available communication service based on predetermined policies, wherein said predetermined policies comprise comparing at least the level of interactivity for each respective available communication service and selecting the at least one currently available communication service having the highest level of interactivity, wherein the level of interactivity ranges highest to lowest between services of a direct communication service typology and services of a messaging communication service typology; and
   d) to send to a communication service actuator that enables provision of the communication service selected in c), suitable information for starting establishment of the communication session between the calling user and the called user through the selected communication service.

18. A communication system comprising a plurality of user devices, network equipment and a plurality of communication service actuators enabling provision of a corresponding plurality of communication services, wherein:

each of the plurality of user devices comprises modules configured to send to the network equipment a request to establish a communication session between a calling user and a called user, the called user being associated with at least one called user device;

the network equipment comprises modules that, for each of the requests sent from the plurality of user devices, are configured:
   a) to receive said request;
   b) to determine if, among said plurality of communication services, there is at least one communication service currently available to establish a communication session with the called user at the at least one called user device, based on current context information on the calling user and current context information on the called user;
   c) in the affirmative case of b), to select one of the at least one currently available communication service based on predetermined policies, wherein said predetermined policies comprise comparing at least the level of interactivity for each respective available communication service and selecting the at least one currently available communication service having the highest level of interactivity, wherein the level of interactivity ranges highest to lowest between services of a direct communication service typology and services of a messaging communication service typology; and
   d) to send to the corresponding communication service actuator suitable information for establishing the communication session between the calling user and the called user through a corresponding communication service; and wherein each communication service actuator comprises modules configured to receive said suitable information from the network equipment and to use said suitable information to start establishment of the communication session between the calling user and the called user through the corresponding communication service.

* * * * *